W. H. SNYDER.
ANTISKIDDING DEVICE FOR VEHICLE WHEELS.
APPLICATION FILED MAY 8, 1920.
1,386,377.
Patented Aug. 2, 1921.
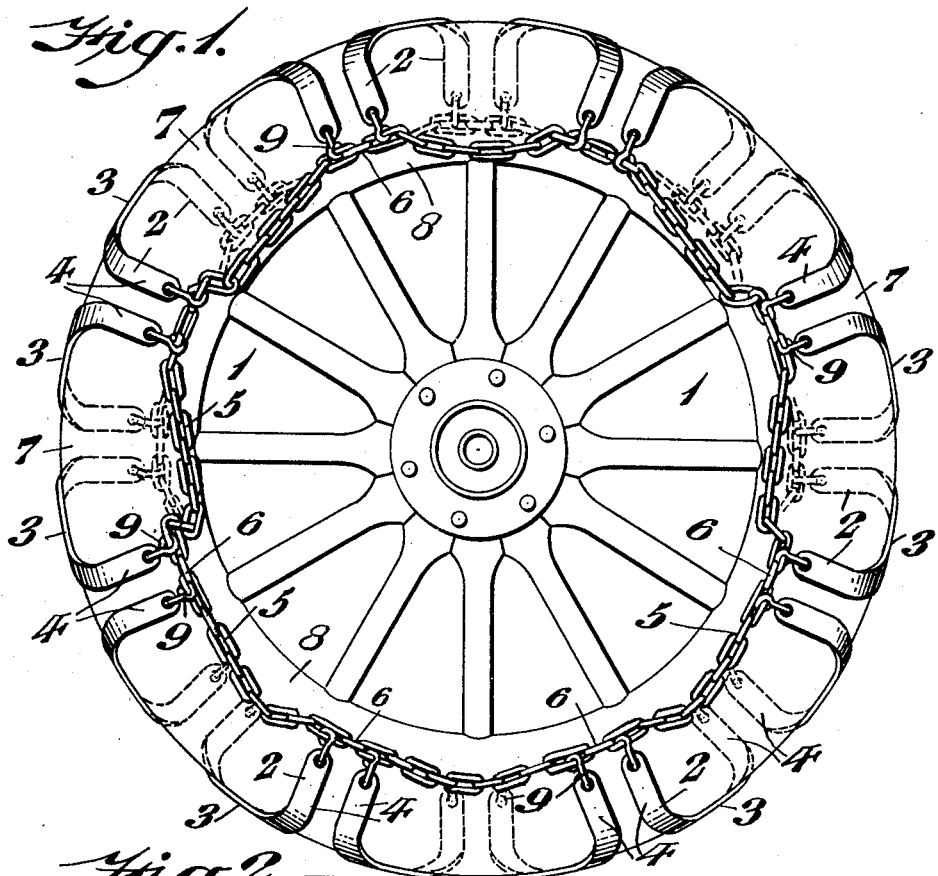
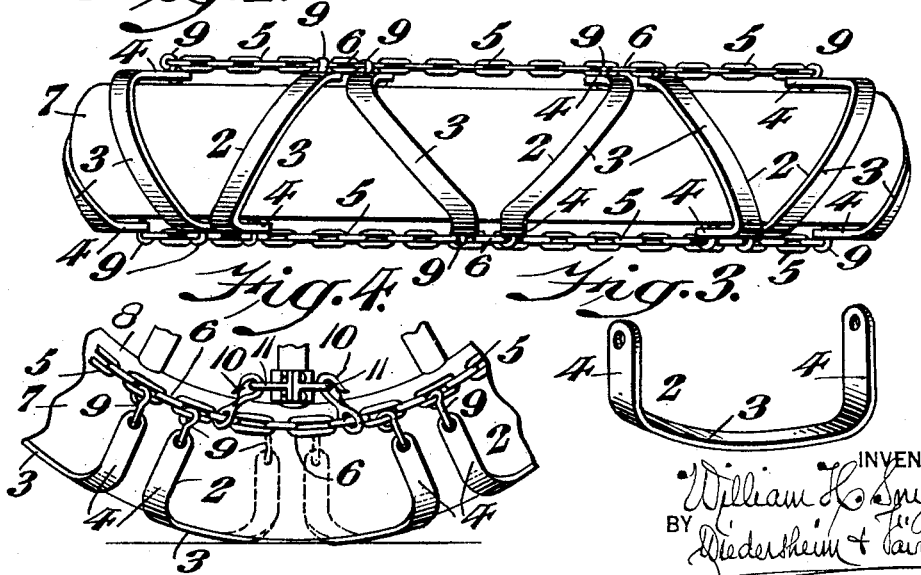
INVENTOR:
William H. Snyder
BY Diederheim + Fairbank
ATTORNEYS.

UNITED STATES PATENT OFFICE.

WILLIAM H. SNYDER, OF ASHBOURNE, PENNSYLVANIA.

ANTISKIDDING DEVICE FOR VEHICLE-WHEELS.

1,386,377.   Specification of Letters Patent.   Patented Aug. 2, 1921.

Application filed May 8, 1920. Serial No. 379,703.

*To all whom it may concern:*

Be it known that I, WILLIAM H. SNYDER, a citizen of the United States, residing at Ashbourne, in the county of Montgomery, State of Pennsylvania, have invented a new and useful Antiskidding Device for Vehicle-Wheels, of which the following is a specification.

My invention consists of an anti-skidding device for a vehicle wheel which is composed of yokes adapted to embrace the tread and sides of the tire of the wheel, and means for connecting them with the tire, the cross bars of said yoke extending diagonally or obliquely on said tread and being adapted when in use to tighten automatically on the tread with torsional effect so as to be prevented from shifting on the tire and caused to take firm hold of the ground, road or street without liability to slip thereon, whereby skidding is effectively prevented.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of an anti-skidding device for a vehicle wheel embodying my invention.

Fig. 2 represents an edge view thereof.

Fig. 3 represents a perspective view of a detached member thereof.

Fig. 4 represents a side elevation of another embodiment of the invention.

Referring to the drawings, 1 designates a wheel of an automobile or other vehicle of well known form to which, however, my invention is not limited.

2 designates a series of yokes which are applied to the tire of the wheel to prevent skidding of the latter, said yokes consisting each of the cross bar 3, and angularly extending ears 4 on the terminals thereof, said bars extending diagonally or obliquely from said ears.

To said ears are connected the sections of chains 5 and 6 formed of links or other suitable flexible members of differential lengths so as to preserve the diagonal or oblique direction of the cross bars 3, it being noticed that the yokes are applied to the tire of the wheel so as to embrace the tread and side portions of said tire and portions of the felly 8 if so desired and the chains are disposed adjacent at the sides of said felly.

It will be seen that the series of yokes and the chains connecting them form an articulated ring like structure which extends around the tire and felly of a wheel and said yokes are arranged with their diagonal or oblique bars 3 alternating to the right and left, or zigzag or staggered on the tread portion of the tire, consequently, when the wheel is running the bars 3 take hold of the ground, road, or street with a draw-like effect and cause the ground, road or street to impart a torsional turn to said bars whereby the ears 4 are forced inwardly against the opposite sides of the tire and so tightened against the same that slipping of the bars on the tire is prevented and the tendency of the tire and consequently of the wheel to skid is overcome and obviated.

While the sections of chains are long and short, or differential in lengths as has been stated, and they connect the series of yokes, they are of sufficient length to allow a short play of the yokes on the tire so that they are permitted to give to a limited extent in their torsional motions, and so cause the opposite ears of each yoke to be pressed inwardly against the side of the tire at different places of the latter and tightened thereagainst, thus firmly engaging said ears with the tire and consequently interlocking the yokes with the tire to prevent displacement of the yokes and slipping thereof on the tire.

It will be noticed that the chains are of differential lengths and are continuous around the tire so as to join the ears one with the other from bar to bar and then on both sides of the tire, and that each section of chains is of greater length than the distance from the ear of one bar to the ear of the adjacent bar, so that they are "slack" and permit torsional-like turns to the bars so that the latter operate by draw-like effects in taking hold of the ground and then tightening on the tire, each chain forming an annular band around the tire.

To permit the fullest flexibility of the chain sections 5 and 6 the yokes are connected with the same by the intermediate hooks 9.

In Fig. 4 the sections of chains are connected with spokes of the wheel by the snap or other hooks 10 and eyes 11 as additional means for retaining the device in position on the tire.

Having thus described my invention what I claim as new and desire to secure by Letters Patent, is:—

1. An anti-skidding device consisting of bars applicable to a tire and adapted to be disposed transversely obliquely on the tread of a tire, said bars being U-shaped and spaced apart in reversed directions, and flexible members connecting the side terminals of said bars and being continuous around the device on both sides thereof.

2. An anti-skidding device consisting of U-shaped bars which are adapted to extend obliquely across the tread of a tire and on the sides thereof, the terminals of said sides being alternately close and spread apart, and lengths of chain-like members adapted to connect said terminals respectively on each side of the device and extending continuous around the latter, and means for connecting flexibly said chain-like members with said terminals.

WILLIAM H. SNYDER.

Witnesses:
JOHN A. WIEDERSHEIM,
N. BUSSINGER.